(12) United States Patent
Swan (10) Patent No.: US 7,786,622 B2
(45) Date of Patent: Aug. 31, 2010

(54) JUVENILE PRODUCT INDUCTIVE POWER TRANSFER

(75) Inventor: Jeffrey Swan, West Chester, PA (US)

(73) Assignee: Graco Children's Products Inc., Exton, PA (US)

( * ) Notice: Subject to any disclaimer, the term of this patent is extended or adjusted under 35 U.S.C. 154(b) by 250 days.

(21) Appl. No.: 12/040,631

(22) Filed: Feb. 29, 2008

(65) Prior Publication Data

US 2008/0211314 A1 Sep. 4, 2008

Related U.S. Application Data

(60) Provisional application No. 60/892,361, filed on Mar. 1, 2007.

(51) Int. Cl.
*H01F 27/06* (2006.01)
(52) U.S. Cl. .................................................... 307/104
(58) Field of Classification Search ................. None
See application file for complete search history.

(56) References Cited

U.S. PATENT DOCUMENTS

| | | | | |
|---|---|---|---|---|
| 4,719,550 A | * | 1/1988 | Powell et al. | 363/37 |
| 5,311,419 A | * | 5/1994 | Shires | 363/65 |
| 5,680,028 A | * | 10/1997 | McEachern | 320/108 |
| 5,949,155 A | * | 9/1999 | Tamura et al. | 307/107 |
| 5,982,645 A | * | 11/1999 | Levran et al. | 363/37 |
| 6,016,046 A | * | 1/2000 | Kaite et al. | 320/108 |
| 6,118,249 A | * | 9/2000 | Brockmann et al. | 320/108 |
| 6,288,916 B1 | * | 9/2001 | Liu et al. | 363/37 |
| 6,301,128 B1 | * | 10/2001 | Jang et al. | 363/17 |
| 6,803,744 B1 | | 10/2004 | Sabo | |
| 7,211,986 B1 | * | 5/2007 | Flowerdew et al. | 320/108 |
| 7,233,222 B2 | * | 6/2007 | Baarman et al. | 336/121 |
| 7,408,324 B2 | * | 8/2008 | Baarman et al. | 320/108 |
| 7,462,951 B1 | * | 12/2008 | Baarman | 307/9.1 |
| 7,510,293 B2 | * | 3/2009 | Chyn | 362/103 |
| 7,518,886 B1 | * | 4/2009 | Lai et al. | 363/17 |
| 7,521,890 B2 | * | 4/2009 | Lee et al. | 320/108 |
| 7,525,283 B2 | * | 4/2009 | Cheng et al. | 320/108 |
| 7,576,514 B2 | * | 8/2009 | Hui | 320/108 |
| 7,622,825 B2 | * | 11/2009 | Brune et al. | 307/82 |

(Continued)

OTHER PUBLICATIONS

Philips Sonicare Elite Product Overview, www.sonicare.com, 2004.

*Primary Examiner*—Stephen W Jackson
*Assistant Examiner*—Adi Amrany
(74) *Attorney, Agent, or Firm*—Lempia Braidwood LLC (57) ABSTRACT

A juvenile product includes a power adapter comprising a first AC-to-DC converter to generate a DC transmission voltage from a line power source, and a power cable coupled to the power adapter and configured to carry the DC transmission voltage. A power transmitter coupled to the power cable includes a transmitter coil and a DC-to-AC converter coupled to the transmitter coil such that an AC current flows through the transmitter coil based on the DC transmission voltage. A power supply includes a receiver coil configured for generation of induced current in the receiver coil via inductive coupling with the transmitter coil, and further includes a second AC-to-DC converter coupled to the receiver coil to generate DC power based on the induced current. An electrical load coupled to the power supply is configured for operation via the DC power.

13 Claims, 4 Drawing Sheets

U.S. PATENT DOCUMENTS

| | | | |
|---|---|---|---|
| 7,622,891 B2 * | 11/2009 | Cheng et al. | 320/108 |
| 2007/0029965 A1 * | 2/2007 | Hui | 320/112 |
| 2007/0182367 A1 * | 8/2007 | Partovi | 320/108 |
| 2008/0116847 A1 * | 5/2008 | Loke et al. | 320/108 |
| 2008/0194349 A1 * | 8/2008 | Kwon | 472/118 |
| 2008/0304296 A1 * | 12/2008 | NadimpalliRaju et al. | 363/45 |

* cited by examiner

JUVENILE PRODUCT INDUCTIVE POWER TRANSFER

CROSS-REFERENCE TO RELATED APPLICATIONS

This application claims the benefit of U.S. provisional application entitled "Inductive Power Transfer for Children's Products," filed Mar. 1, 2007, and having Ser. No. 60/892,361, the entire disclosure of which is hereby expressly incorporated by reference.

BACKGROUND OF THE DISCLOSURE

1. Field of the Disclosure

The present disclosure is generally directed to juvenile products, and more particularly to the transfer of electrical power to juvenile products.

2. Description of Related Art

Many juvenile products incorporate electrically powered components and features. Electric motors and the associated control electronics are common. In child swings, for example, one motor supports the swinging motion while an additional motor generates vibration. Many juvenile products are configured with speakers for music or sound playback, as well as lights for illumination and generation of other visual effects. With each additional electrical function, the power demand of the juvenile product increases, and the power supply becomes more important to the overall performance of the product.

DC power has typically supported these components and functions. In most cases, the juvenile product receives DC power from batteries. In other cases, AC power from a standard wall outlet is converted with a power adapter having an AC/DC converter.

Both power sources present potential drawbacks. Batteries often work well to provide the power required by these electronic features, but they can be expensive and inconvenient to replace. Rechargeable batteries are also burdened with many of the limitations of conventional batteries, and often fail to provide a consistent voltage level. Batteries also generally present a risk of exposure to dangerous chemical substances via leaks arising from battery corrosion, improper installation, etc. Past efforts to address the drawbacks of battery power have included (i) inhibiting child access to the batteries, (ii) specialized battery compartment designs to prevent improper installation, and (iii) gaskets or sponge absorbers to contain leaks.

Use of a power adapter connected to line power eliminates the costs and complications associated with batteries, but the power cord connected to the product can raise other safety issues. A child's attraction to the visible wire extending from the product can lead to a host of problems.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosure is generally directed to inductive power transfer systems and techniques to provide children's products and devices with the safety of battery operation along with the economic and convenience advantages of other power sources, such as AC line power. Generally speaking, the disclosed techniques and systems help to keep a child away from power cords, including those connected to a line power outlet and those tethered to the product. As described below, in some cases, the disclosed techniques involve a cord carrying a DC transmission voltage that may be obstructed and positioned to minimize the likelihood of child interaction. In other cases, neither AC nor DC power cords are used, inasmuch as transfer electronics are disposed in a housing or structure directly plugged into the line power outlet. Further details regarding these aspect of the disclosure are set forth in connection with a number of exemplary embodiments described below.

The inductive power transfer techniques disclosed herein provide a safe, economical way to transfer power to support the electrical loads of a variety of juvenile product types. The support may be direct or indirect. The disclosed techniques may provide power directly to components or features of the juvenile product or, alternatively or additionally, charge one or more rechargeable batteries that, in turn, drive the electrical loads of the juvenile product. In either way, a variety of different electrical loads (e.g., motors, control circuitry, etc.) can be supported. It follows that the teachings of the present disclosure can be applied in a variety of juvenile product contexts, including without limitation the transfer of electrical power to the components of swings, activity centers, play yards or mats, bouncing seats, and car seats. The child swings described and shown herein are therefore set forth with the understanding that they are exemplary in nature.

Unlike past uses of inductive power transfer, the inductive power transfer techniques described herein eliminate or minimize the presence of power cords tethered to the juvenile product. Inductive power transfer to charge an electric toothbrush battery is, in contrast, directed to maintaining a water tight seal via the absence of electrical contacts. In those cases, a power cord still runs to the base unit. The presence of such power cords can present a safety issue for children. The safety concerns are heightened in the juvenile product context when the power cord carries AC line power, and further heightened when the power cords are continuously present during product operation. Juvenile products having a large electrical load, as well as those not well-suited or configured for rechargeable batteries, can present this challenge.

Application of the disclosed techniques can help avoid the connection of any power cords to the components of the juvenile product with which a child interacts or engages (or can interact or engage). In some cases, a power cord is entirely absent. In other cases, a power cord not carrying AC line power only runs to a transmitter or transmitter unit spaced from the user-accessed (or otherwise accessible) components of the juvenile product. Without a direct connection to those components, a child will be less likely to engage the power cord. As described herein, the positioning and characteristics of the transmitter unit, as well as the obstructive covering of the cord (and/or transmitter unit), can dramatically lower the possibility of child contact with the cord, thereby minimizing potential risks like strangulation, electric shock, and trip hazards.

Figure 1:
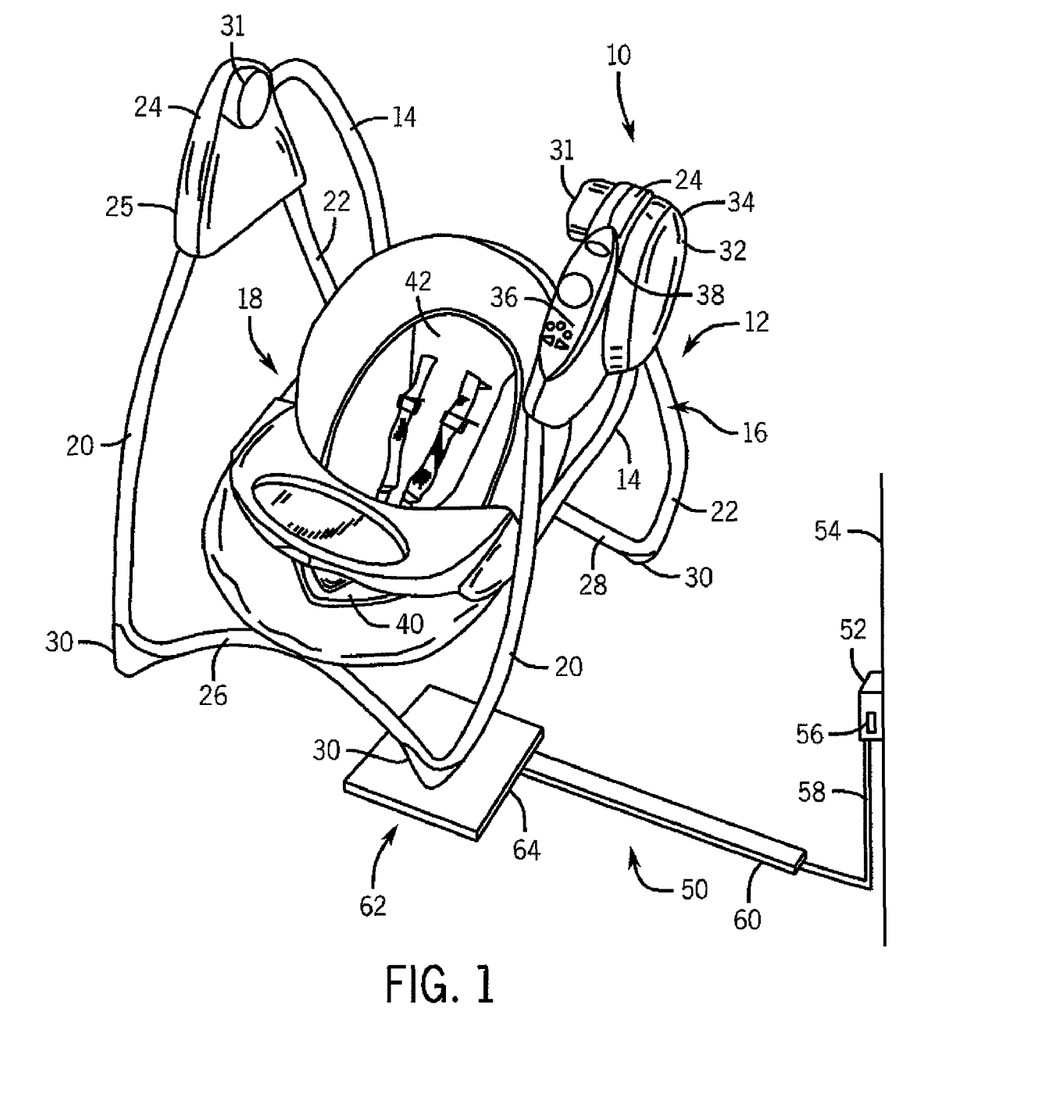
FIG. 1 shows one example of a juvenile product with inductive power transfer in accordance with an embodiment having a DC transmission line leading to a transmitter/receiver pairing.

With reference now to the drawing figures, FIG. 1 depicts a swing generally indicated at 10 with a structural frame generally indicated at 12. The frame 12 includes a pair of hanger arms 14 rotatably coupled and suspended from a structural support assembly 16 of the frame 12. The structural support assembly 16 supports the hanger arms 14 at a height above a reference surface upon which the swing 10 rests (e.g., a floor) such that a seat indicated generally at 18 is also suspended above the reference surface. To that end, the structural support assembly 16 includes front legs 20, rear legs 22, and pivot sleeves 24 in which the front and rear legs 20, 22 are contained. Each pivot sleeve 24 may be formed as a cover 25 with an underside opening from which one of the front legs 20 and one of the rear legs 22 extend downward (i.e., toward the reference surface). When extended outward to the limits allowed by the opening in the cover 25 of the sleeve 24, the legs 20, 22 form an inverted V-shaped support or riser. The limits on outward extension of the legs 20, 22 ensure that the seat 18 remains spaced from the floor for reciprocating, swinging motion. Each front and rear leg 20, 22 is pivotably attached within one of the sleeves 24 to permit inward movement (i.e., retraction) of the legs 20, 22 toward a folded configuration convenient for storage, etc.

A front cross member 26 provides additional support by coupling the front legs 20 at the ends thereof near the reference surface. A rear cross member 28 similarly couples the rear legs 22. The front and rear cross members 26, 28 may be integrally formed or otherwise connected with the legs 20, 22, respectively. In this example, four feet 30 are connected to the legs 20, 22 and the cross members 26, 28 at the respective contact points with the reference surface. In some cases, the feet 30 can aid in coupling the legs and the cross members. Alternatively or additionally, the feet 30 provide a stable base or groundwork for the frame 12 and the structural support assembly 16. More generally, the shape, configuration, and components of the structural support assembly 16 and, more generally, the frame 12, may vary considerably.

Each of the hanger arms 14 may be pivotably attached to the structural support assembly 16 near a corresponding one of the sleeves 24. More specifically, the hanger arms 14 may be attached at a pivot joint 31 disposed on an inward side of one of the covers 25. In this example, each hanger arm 14 extends rearward from the pivot joint 31 before curving downward to meet the seat 18. Alternatively, the hanger arms 14 extend axially inward from the pivot joints 31. Moreover, the hanger arms 14 need not extend from the housing of a dedicated pivot joint (e.g., the pivot joint 31), but rather may extend from a slot or other opening (not shown) in the corresponding sleeve 24. For example, the hanger arms 14 may extend from a rearward facing surface of the cover 25 of the corresponding sleeve 24. Still further, the hanger arms 14 need not be rotatably positioned about the axis about which the legs 20, 22 rotate, as is the case in the example shown in FIG. 1. Thus, a variety of other configurations of the hanger arm(s) 14 and the legs 20, 22 are equally suitable for practice with the disclosed techniques.

The swing 10 includes an electric motor drive mechanism 32 to generate swinging motion of the seat 30. The drive mechanism 32 is positioned at or near the pivot point of one of the pivot sleeves 24 to reciprocate or otherwise displace the hanger arm 14. In this example, the electric motor and other components of the drive mechanism 32 are generally disposed within a dedicated housing 34 mounted on, or coupled to, one of the pivot sleeves 24. Practice of the disclosed techniques is not limited to any particular type of electric motor. In some examples, a DC motor is used, which may, for instance, be well suited for embodiments having one or more rechargeable batteries (not shown) to store power transferred via the disclosed techniques. Notwithstanding the foregoing, any one of a variety of different electric motors commonly used in the juvenile product context are well suited for use with the disclosed techniques. Other aspects of the drive mechanism may also vary considerably, as desired.

The swing 10 may include one or more electrical loads in addition to the electric motor 32. For example, the swing 10 may also include a control panel 36 having any number of user interface elements. The control panel 36 provides an input/output interface for an electronic control unit (not shown). The control unit may include one or more microcontrollers (not shown) and any number of other electronic components (not shown) disposed in an enclosure 38 behind the control panel 36. Alternatively or additionally, one or more components of the control unit may be located in the housing 34 of the drive mechanism 32 or within the cover 25. The control panel 36 may be used to adjust, customize, or configure the operation of the swing 10 via the control unit in various ways, including, for instance, selecting a swing (i.e., motor) speed, selecting sound for playback, adjusting a playback volume, and activating one or more lights (not shown). In any case, the operation of the control unit presents further electrical load. One or more of the user interface elements of the control panel 36 can also present further electrical load via, for instance, illumination. Other examples of features or components drawing electrical power are an amplifier for audio or other sound playback and a vibration motor (not shown) disposed in a seat bottom 40 or a seat back 42 of the seat 18. The foregoing examples are provided, however, with the understanding that practice of the disclosed techniques is not limited to any particular type or extent of the electrical load of the juvenile product.

In accordance with one aspect of the disclosure, the electrical load of the swing 10 is driven via a power transfer system indicated generally at 50. In the embodiment shown in FIG. 1, the system 50 includes a power adapter 52 to receive power from a line power outlet, or receptacle, in a room wall 54. The power adapter 52 includes an AC-to-DC converter depicted schematically at 56 to generate a DC voltage from the power line source (e.g., 115 Volts at 60 Hertz). In some cases, the power adapter 52 also includes one or more fuses or circuit breakers for safety purposes in the event that an excessive amount of current is drawn by the swing 10. The power adapter 52 may also include other circuitry for meeting regulatory requirements, conditioning the line power, or regulating the DC output voltage, as desired.

As shown in FIG. 1, wiring 58 running from the power adapter 52 along or near the wall 54 delivers the DC voltage to the other components of the system 50. The wiring 58 may take the form of a power cable or cord, and be made of any suitable set of materials. The materials may be selected such that the wiring 58 is rigid, semi-rigid or flexible. The exact positioning of the wiring 58 may vary considerably, but it may be useful to configure the wiring 58 such that it can be securely positioned, covered or otherwise obscured. In these ways, the wiring 58 is not as likely to attract the attention of a child in the vicinity of the swing 10. In the example shown, a power cable serving as the wiring 58 is covered by a strip 60 as the cable runs along the floor. In other cases, the cable can run under a rug, carpet, mat or other covering or obstruction.

Similarly, a further strip or other covering may be used for the wiring 58 along the wall 54, thereby decreasing, if not eliminating, the possibility of child access or contact.

The DC voltage generated by the power adapter 52 transmits power to the swing 10 as a DC transmission voltage delivered to a power transmitter indicated generally at 62. The DC transmission voltage may be set to a level well suited for safe and efficient transmission through the system 50. The length, gauge and other characteristics of the wiring 58 may be selected in accordance with these interests. The voltage level of the DC transmission may also be determined based on whether the power is initially directed to battery charging or, alternatively or additionally, directly powering one or more non-battery loads of the swing 10. The maximum current to be drawn by the power transmitter 62 may also be considered in selecting a desired DC transmission voltage level.

The power transmitter 62 in this example includes a pad or mat 64 in which an inductive power transmitter unit is housed or embedded. The pad 64 has a thin profile to allow the structural support 16 of the swing 10 to be positioned on the pad 64 without rendering the swing 10 unstable. The thin profile (and other characteristics) of the pad 64 may be configured to rest on the floor in an unobtrusive and inconspicuous manner. In this way, a child is unlikely to engage the transmitter unit 62. To those ends, the pad 64 may also be positioned under a rug or other floor covering (not shown). In other cases, the transmitter unit 62 may be positioned under the reference surface upon which the swing 10 rests (e.g., below the sub-flooring via access to a basement or lower level).

The pad 64 may be integrated to any desired extent with the other aspects of the system 50 directed to obscuring and otherwise managing the power cord or wiring 58. Thus, in one example, the pad 64 may be an extension of the strip 60. Alternatively or additionally, a cord management mechanism may be incorporated into the pad 64 (or at some other point along the wiring 58) to adjust the length of the wiring 58, thereby minimizing any slack that could otherwise lead to trip hazards or attention from a nearby child.

Further details regarding the power transmitter 62 and the inductive power transmitter unit thereof are set forth below in connection with the example shown in FIG. 2. Generally speaking, however, the power transmitter 62 is coupled to the wiring 58 to receive the DC transmission voltage and configured to convert the DC transmission voltage into an AC signal suitable for inductive coupling via a transmitter/receiver coil pairing. The power receiver unit may be positioned at a variety of locations on the swing 10 in proximity to the power transmitter 62. In one example, the power receiver unit is embedded or housed in one or more of the feet 30. In that way, resting one of the feet 30 on the pad 64 positions the transmitter/receiver coil pairing sufficiently close for efficient and effective inductive coupling.

In operation, the power transfer via the inductive coupling may be used to directly support the electrical load of the swing 10 and/or to charge one or more batteries that, in turn, supply power to the other electrical components of the swing 10. In either case, power is supplied to the swing 10 when the transmitter/receiver coupling is in sufficient proximity. That characteristic of the system 50 establishes a spatial limit on the transfer of power, which may further enhance the safety and other operational characteristics of the swing 10. For example, it may be desirable to prevent a child from moving the swing 10 to an unsafe or otherwise improper position. That is, the swing 10 can be configured to be operational only when oriented or positioned in a desired location established by the positioning, size, etc. of the pad 64. In embodiments without batteries, this spatial control on operation is inherently present. In battery-equipped embodiments, the control panel 36 may be configured with a user select (or button) to determine whether operation should be limited in this way. In either case, any substantial displacement would then cause the swing 10 to deactivate before an unsafe condition arises.

In other cases involving battery-equipped products, the juvenile product need only be positioned in proximity to the transmitter unit during a charging phase. Subsequent use of the juvenile product is then not limited to the position of the mat or other transmit unit configuration.

The size and shape of the pad 64 (or other transmitter structure) may be configured to address an interest in spatial control of power transfer or accommodate other design criteria, such as coupling efficiency. In the former case, a smaller pad restricts the product location to a higher degree, while a larger pad provides more flexibility in product location. Examples directed to coupling efficiency may involve a pad shaped, sized or otherwise configured to engage the power receiver (or a portion thereof) for a tight fit and, thus, close proximity of the coils, maximizing coupling. A wide variety of shapes and configurations may be used for mating or coupling the receiver and transmitter units. It follows that practice of the disclosed techniques is not limited to transmitters that are flat or thin, much less uniformly flat or thin as shown in the example of FIG. 1.

Figure 2:
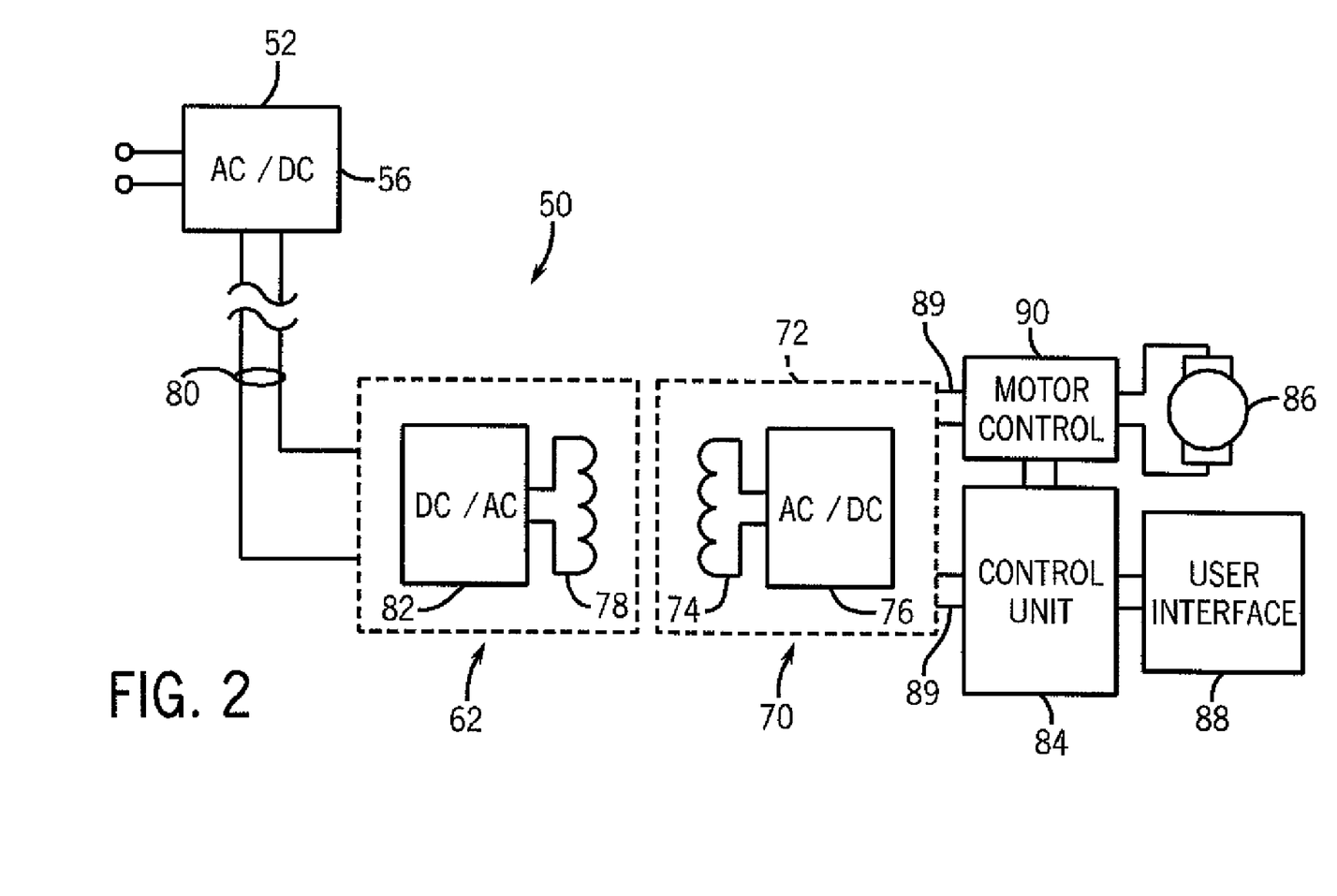
FIG. 2 is a schematic representation of an exemplary circuit implementing the inductive power transfer technique of FIG. 1.

FIG. 2 schematically depicts one example of the power transfer system 50 to show the transmitter/receiver pairing and other components thereof in greater detail. In this example, a power supply 70 of the swing 10 includes a power receiver 72 positioned in sufficiently close proximity to the power transmitter 62. The power supply 70 may include a number of circuit components for regulating, managing, controlling and otherwise supplying power to the remainder of the juvenile product. To this end, the power supply 70 may include one or more batteries (not shown) and any associated battery charging (e.g., trickle charging) control circuits (not shown). Furthermore, the power supply 70 may be configured to generate any number of power source voltages for the various components of the juvenile product. In this way, the power supply 70 can accommodate different current or voltage requirements or preferences. More generally, the power supply 70 includes a receiver coil 74 and an AC-to-DC converter 76 coupled to the receiver coil 74. The receiver coil 74 and the AC-to-DC converter 76 need not be directly connected as shown, but rather may be coupled by one or more circuits that regulate, condition or otherwise prepare the current induced in the receiver coil 74 for conversion. In operation, the AC-to-DC converter 76 helps generate DC power to drive the electrical load of the juvenile product.

Current is induced in the receiver coil 74 based on the AC current present in a transmitter coil 78 of the power transmitter 62. The configuration of the receiver and transmitter coils 74, 78 may vary considerably, as desired. For instance, the number of turns in either coil 74, 78 may be selected to configure the pairing as an up or down transformer. The structure and material of a core (not shown) may be selected to maximize or otherwise control inductive coupling.

As described above in connection with FIG. 1, this embodiment incorporates a DC transmission voltage into the transfer technique to minimize the possibility of child interaction with the standard line power (e.g., 115 Volts). In this example, a power cable 80 is configured to carry the DC transmission voltage between the power adapter 52 and the power transmitter 62. The DC transmission voltage is generated via the AC-to-DC converter 56 in the power adapter 52, which may include a number of other components and circuitry either directly or indirectly involved in the generation of the DC transmission voltage. However, generally speaking, the AC-to-DC converter 56 helps to convert the line power to a DC voltage level suitable for safe and efficient transmission via the power cable 80.

Before the inductive power transfer can occur, the DC transmission voltage (or some DC derivative thereof) is converted back into AC power via a DC-to-AC converter (or power inverter) 82 of the power transmitter 62. As a result, two conversions occur before the inductive transfer. While these conversions may be considered to be a source of inefficiency, the load of the juvenile product can still be effectively driven even if a significant fraction of the AC line power is lost via the two conversions. Any inefficiencies in the delivery of the line power to the inductive coupling would also be insignificant in embodiments in which the power is initially directed to battery recharging.

The AC-to-DC converters 56, 76 and DC-to-AC converter 82 may be configured in a variety of manners. For example, power MOSFET or other transistor switches conventionally involved in the generation of a DC signal may be used. For the DC-to-AC converter (or power inverter) 82, it should be noted that one or more circuit components of a conventional power inverter may be considered to be shared by the DC-to-AC converter 82 and the transmitter coil 78. That is, the power transmitter 62 may be configured such that the transmitter coil 78 is integrated with an output stage of the DC-to-AC converter 82. In this way, a separate transformer in the output stage may not be necessary. In other cases, the coil 78 and the converter 82 may be coupled (i.e., separated) by another circuit element or constitute off-the-shelf components, in which case there may be minimal sharing or integration, if any.

In operation, the power transfer system 50 as shown in FIG. 2 can support a number of components of a juvenile product based on the AC line voltage in a safe and, despite the extra conversions, reasonably efficient manner. At the outset, the line voltage is converted by the converter 56 to generate the DC transmission voltage carried by the cable 80. The DC transmission voltage is delivered to the power transmitter 62 such that the DC power is eventually provided to the inverter 82 for conversion back into AC power. The AC power is then fed to the transmitter coil 78 for inductive transfer to the receiver coil 74 and conversion back into DC power by the converter 76. The inductive coupling is established via the positioning of the transmitter/receiver pairing, which may vary considerably from a structural standpoint. Eventually, DC power is provided to the load of the juvenile product, which in this case is schematically represented by a control unit 84 (e.g., one or more microcontrollers, microprocessors, or an application specific integrated circuit (ASIC)), a DC electric motor 86, and a user interface 88. To this end, wiring or other conductors 89 may be disposed within the structural frame components (see, e.g., FIG. 1) to carry the DC power to the powered components. Alternatively, the conductors 89 may carry the AC power induced in the receiver coil 74 to a remote location within the juvenile product at which the converter 76 is located. This configuration may be useful, if, in fact, multiple DC power levels are generated, or multiple power lines are established, to accommodate different components. In some cases, the motor 86 may be controlled and supplied with power via the control unit 84. In the example shown, however, the motor 86 is controlled by a motor control circuit 90 that receives power from the power supply circuitry 70 and control signals from the control unit 84.

As described above, the disclosed techniques are not limited to any particular form (e.g., shape, size, etc.) or position of the power transmitter. That is, the transmitter/receiver pair need not be disposed at or near the reference surface upon which the juvenile product rests. Instead, the power transmitter and receiver may be disposed at a height or level spaced from the floor or other reference surface. As described above, the power transmitter may be disposed beneath the floor. The orientation of the pairing may also vary. That is, the pairing may be laterally oriented rather than vertically. One example of a lateral pairing is set forth below.

Figure 3:
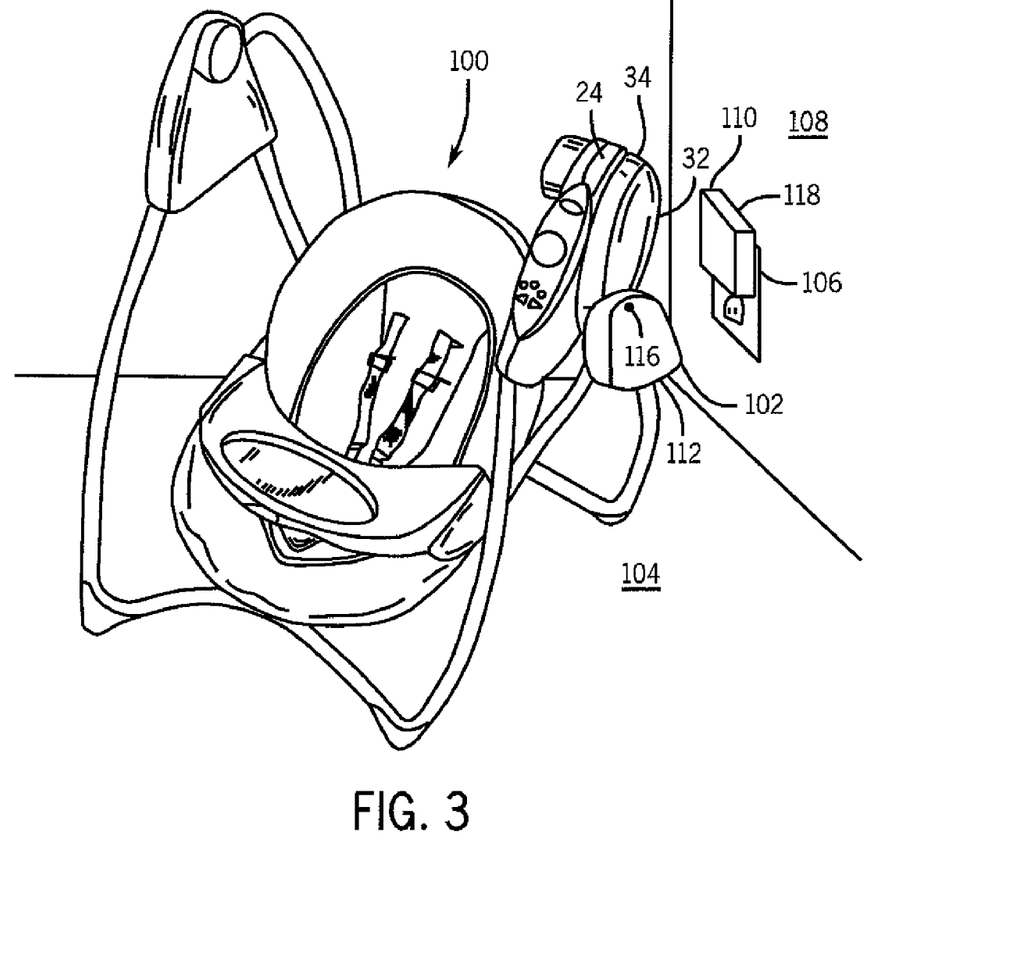
FIG. 3 shows one example of a juvenile product with inductive power transfer in accordance with an embodiment having a transmitter/receiver pairing at a line power wall outlet; and, FIG. 4 is a schematic representation of an exemplary circuit implementing the inductive power transfer technique of FIG. 3.

With reference now to FIG. 3, a swing 100 structurally configured in similar fashion to the swing 10 (FIG. 1) includes a power transfer system in which a receiver 102 is spaced from a floor 104 upon which the swing 100 is disposed. More specifically, the receiver 102 is mounted on the swing 100 at a height to match the conventional height of a standard AC power line outlet 106 on a wall 108. In this case, a transmitter 110 is plugged into the outlet 106 to establish the inductive pairing. The swing 100 is then placed near the wall 108 to obtain power with no cords. In some cases, the power is delivered during a battery recharging session or stage, while in non-battery embodiments, the power is delivered during some other phase of operation.

In the example shown, the receiver 102 includes a housing 112 mounted on the housing 34 of the drive system 32. That location is shown with the understanding that the receiver 102 may be mounted or integrated in a variety of locations on or in the frame 12, the structural support assembly 116, or any component mounted thereon. In other cases, the receiver 102 may be disposed within the housing 34 or any other component of the swing 100. More generally, the receiver 102 need not be a permanent fixture of the device, but rather may be a detachable, removable or otherwise adjustable unit. In this case, the housing 112 is mounted at a pivot joint 116 so that the height and positioning of the receiver 102 can be adjusted to match the transmitter 110. After rotation about the pivot joint 116, a mechanism (not shown) may be used to retain the position of the housing 112. Other examples may alternatively or additionally involve a slidable engagement of the receiver 102 and the structural support assembly 116 or other component of the swing 100 to adjust the height or other position of the receiver 102.

The form of the transmitter 110 may vary considerably. In this example, the transmitter 110 includes a housing 118 having an slim profile so as to not extend too far from the wall 108. In alternative embodiments, the profile of the transmitter 110 may be wider to accommodate juvenile products that cannot be easily positioned near the wall 108. The housing 118 may be adjustable to provide further flexibility in positioning, and may include more than one component for extension (e.g., telescoping).

Figure 4:
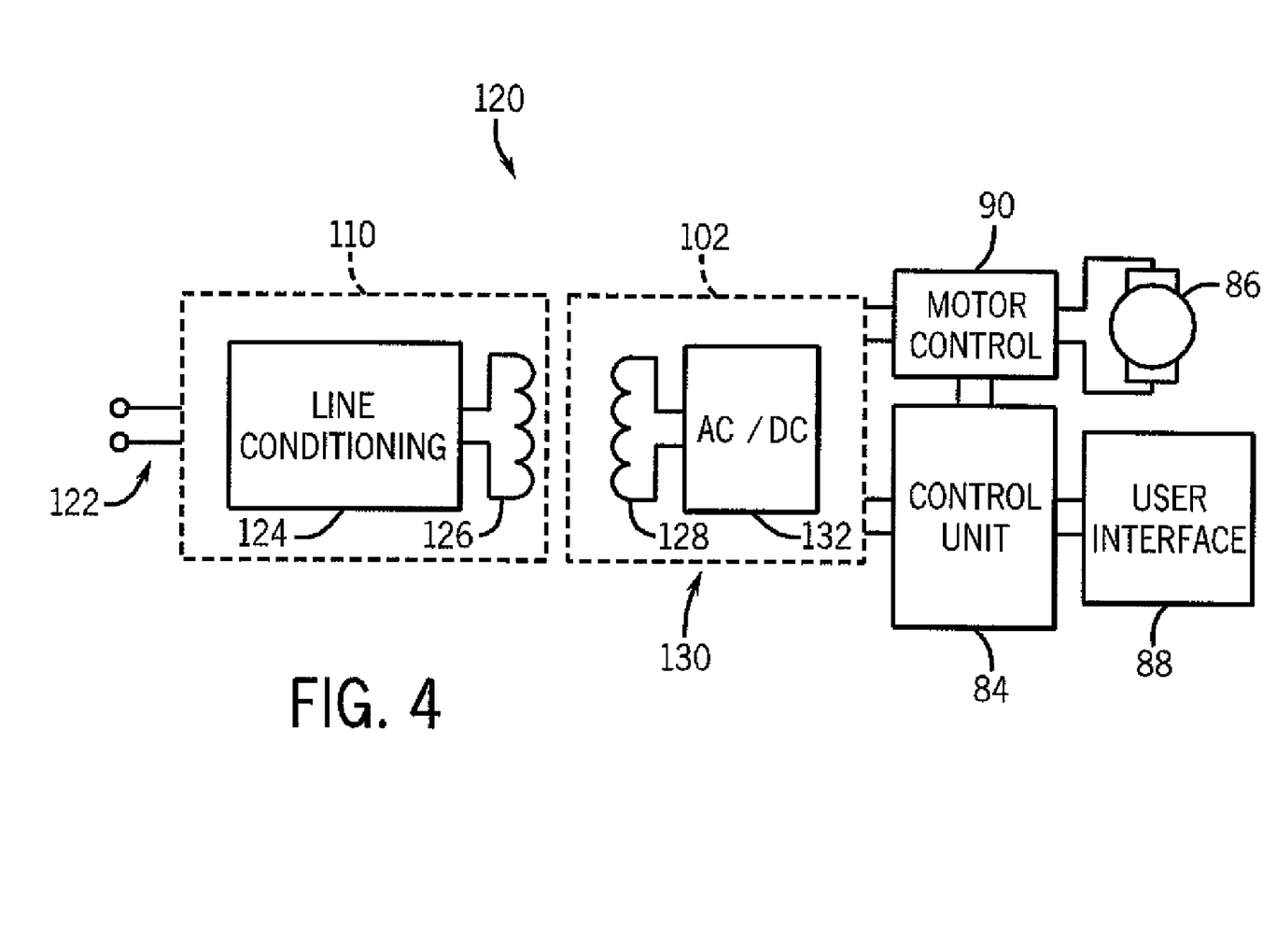

FIG. 4 depicts one example of a power transfer system indicated generally at 120 to support the delivery of power for the swing 100. The system 120 is similar to the system 50 (FIG. 2) in some respects but differing in the absence of any wiring or cable for transmission of power to the transmitter 110. Instead, a plug mounted on the housing 118 (FIG. 3) is schematically shown at 122 and configured to engage a receptacle (not shown) of the wall outlet 106 (FIG. 3) directly. AC line power is therefore made available to the transmitter 110, which may include a line conditioning circuit 124 or other circuitry (e.g., circuit breakers) in preparation for the inductive coupling. AC power is eventually provided to a transmitter coil 126, which is positioned in proximity to a receiver coil 128 of a power supply 130 of the swing 100. The power supply 130 may, generally speaking, be configured similarly to the power supply 70 of the above-described embodiment, having, for instance, an AC-to-DC converter 132 to generate one or more DC power levels for the swing 100. In some cases, however, the receiver coil 128 may be configured to down convert from a higher voltage near AC line power levels.

In alternative embodiments, a juvenile product may have more than one receiver to accommodate different power transfer configurations. For instance, a swing may have a first receiver disposed in a frame leg or foot as described above, as well as a second receiver mounted at a height for a lateral coupling as described above.

The disclosed systems and devices provide a more economical and environmentally safe solution to conventional battery power without the safety and inconvenience issues of a tethered power cord. While some embodiments may include a cord connected to the wall outlet, the absence of a cord tethered to the juvenile product decreases the likelihood of complications arising from child interaction.

Generally speaking, the transmit unit may be disposed along any surface or in any area to which the juvenile product will be sufficiently proximate for inductive coupling. For example, if the juvenile product involves a child car seat, the transmit unit may be integrated into the car seat upon which the child car seat rests. The corresponding receiver unit in the child car seat may then be relied upon to support the operation of any one or more products, devices or features to provide entertainment (e.g., music) and other functionality. In one example, the child car seat includes a receiver coupled to one or more resistive heaters. The resistive heaters are powered based on the current induced in the receiver without any need for an electrical connection between the child car seat and the automobile seat. In these and other ways, the disclosed inductive power transfer techniques and systems can be applied in a powered car seat context involving a variety of electrically powered components and features.

Although described and shown in connection with a children's swing, the disclosed inductive power transfer techniques and systems may be useful in connection with a variety of juvenile or children's devices and products having electrical or electronic features, such as bouncing seats, activity centers, and other entertainment items, such as music players, books and other devices providing music or other sounds, lights, vibration or other motion, or other functionality via electric power. As a result, the disclosed techniques and systems are not limited to practice with any children's product or device configuration (e.g., a swing stand having legs that rest on a pad interface), but rather are well suited for use in connection with a variety of device and product form factors for which the elimination or minimization of potentially unsafe power cords or other wiring is desirable.

Although certain systems, devices and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A juvenile product comprising:
a structural assembly having a foot that supports a child occupant area above a rest surface;
a power adapter comprising a first AC-to-DC converter to generate a DC transmission voltage from a line power source;
a power cable coupled to the power adapter and configured to carry the DC transmission voltage;
a power transmitter coupled to the power cable and comprising a transmitter coil and a DC-to-AC converter coupled to the transmitter coil such that an AC current flows through the transmitter coil based on the DC transmission voltage;
a power supply comprising a receiver coil disposed in the foot and configured for generation of induced current in the receiver coil via inductive coupling with the transmitter coil when the foot rests upon the power transmitter, and further comprising a second AC-to-DC converter coupled to the receiver coil to generate DC power based on the induced current; and
an electrical load coupled to the power supply and configured for operation via the DC power.

2. The juvenile product of claim 1, further comprising a cover to obstruct the power cable.

3. The juvenile product of claim 1, wherein the power transmitter comprises a pad configured to be disposed along the rest surface.

4. The juvenile product of claim 1, wherein the structural assembly includes a frame, and wherein the foot is one of a plurality of feet that act as a base for the frame.

5. The juvenile product of claim 4, wherein the frame comprises a pair of legs and a cross member coupled to the pair of legs via first and second feet of the plurality of feet.

6. The juvenile product of claim 4, further comprising a further receiver coil mounted on the frame at a height above the first-named receiver coil.

7. A juvenile product comprising:
a structural assembly to support a child occupant area relative to a rest surface;
a power receiver supported by the structural assembly at a height above the rest surface; and
a power transmitter comprising a housing and a plug mounted on the housing such that the plug projects from the housing for engagement with a receptacle of a line power outlet disposed at a height above the rest surface;
wherein the power receiver comprises a receiver coil and the power transmitter comprises a transmitter coil, and wherein the height of the power receiver is matched to the height of the line power outlet for inductive coupling of the transmitter coil and the receiver coil to generate current in the receiver coil when the structural assembly is positioned with the power receiver in proximity to the power transmitter and the line power outlet.

8. The juvenile product of claim 7, wherein the structural assembly comprises a frame, and wherein the power receiver comprises a housing mounted to the frame.

9. The juvenile product of claim 7, wherein the structural assembly comprises a housing, and wherein the power receiver is integrated within the housing of the structural assembly.

10. The juvenile product of claim 9, wherein the housing of the structural assembly encloses an electric motor drive mechanism.

11. The juvenile product of claim 7, wherein the power receiver is adjustably mounted to the structural assembly such that the height of the power receiver is adjustable.

12. The juvenile product of claim 11, wherein the power receiver includes a housing adjustably mounted on the structural assembly at a pivot joint.

13. The juvenile product of claim 7, further comprising a further receiver coil disposed in a foot of the structural frame.

* * * * *